US005525429A

United States Patent [19]
Mannava et al.

[11] Patent Number: 5,525,429
[45] Date of Patent: Jun. 11, 1996

[54] LASER SHOCK PEENING SURFACE ENHANCEMENT FOR GAS TURBINE ENGINE HIGH STRENGTH ROTOR ALLOY REPAIR

[75] Inventors: Seetharamaiah Mannava, Cincinnati; William D. Cowie, Xenia; Stephen J. Ferrigno, Cincinnati, all of Ohio

[73] Assignee: General Electric Company, Cincinnati, Ohio

[21] Appl. No.: 399,320

[22] Filed: Mar. 6, 1995

[51] Int. Cl.⁶ .......................... C21D 7/00; B23P 15/02; B23K 26/00
[52] U.S. Cl. .................. 428/610; 428/660; 428/668; 428/680; 428/937; 148/525; 29/889.1
[58] Field of Search .................. 428/660, 668, 428/680, 937, 610; 29/402.18, 888.021, 889.1; 148/525

[56] References Cited

U.S. PATENT DOCUMENTS

| | | | |
|---|---|---|---|
| 3,566,662 | 3/1971 | Champoux | 72/370 |
| 3,689,176 | 9/1972 | Howell et al. | 416/96 |
| 3,850,698 | 11/1974 | Mallozzi et al. | 148/4 |
| 4,002,403 | 1/1977 | Mallozzi et al. | 350/160 R |
| 4,060,769 | 11/1977 | Mallozzi et al. | 330/4.3 |
| 4,155,152 | 5/1979 | Cretella et al. | 29/156.8 B |
| 4,224,356 | 9/1980 | Singer | 437/34 |
| 4,291,448 | 9/1981 | Cretella et al. | 29/156.8 B |
| 4,401,477 | 8/1983 | Clauer et al. | 148/4 |
| 4,426,867 | 1/1984 | Neal et al. | 72/53 |
| 4,449,714 | 5/1984 | Meier | 277/9 |
| 4,557,033 | 12/1985 | Champoux | 29/525 |
| 4,739,146 | 4/1988 | Lindland et al. | 219/121 PY |
| 4,878,953 | 11/1989 | Saltzman et al. | 148/4 |
| 4,884,820 | 12/1989 | Jackson et al. | 277/53 |
| 4,934,170 | 6/1990 | Easterbrook et al. | 72/370 |
| 4,937,421 | 6/1990 | Ortiz, Jr. et al. | 219/121.68 |
| 5,127,019 | 6/1992 | Epstein et al. | 372/108 |
| 5,131,957 | 7/1992 | Epstein et al. | 148/565 |
| 5,142,778 | 9/1992 | Smolinski et al. | 29/889.1 |
| 5,192,625 | 3/1993 | Fishman | 428/668 |
| 5,226,785 | 6/1993 | Narayana et al. | 415/115 |
| 5,235,838 | 8/1993 | Berstein | 148/510 |
| 5,245,155 | 9/1993 | Pratt et al. | 219/121.63 |
| 5,268,045 | 12/1993 | Clare | 148/518 |
| 5,269,857 | 12/1993 | Ganesh et al. | 148/675 |
| 5,306,360 | 4/1994 | Bharti et al. | 148/525 |
| 5,307,622 | 5/1994 | Ciokajlo et al. | 60/39.162 |
| 5,312,650 | 5/1994 | Dalal et al. | 427/295 |
| 5,318,217 | 6/1994 | Stinson | 228/194 |

OTHER PUBLICATIONS

American Machinist, "Laser Shocking Extends Fatigue Life", by John A. Vaccari, pp. 62–64, Jul. 1992, A Penton Publication.

Primary Examiner—John Zimmerman
Attorney, Agent, or Firm—Andrew C. Hess; David L. Narciso

[57] ABSTRACT

A metallic article and method for producing such an article, having a metallic substrate, at least one metallic layer sprayed onto a laser shock peened surface area of the substrate, and a region having deep compressive residual stresses imparted by laser shock peening extending into the substrate from the laser shock peened surface. The metallic substrate and or layer may be made from an alloy such as a Cobalt or a Nickel based superalloy. The substrate may be made from Nickel Base forgings or Titanium base forgings. An exemplary embodiment of the present invention is a gas turbine engine rotor component such a disk and, more particularly, a turbine disk suitable for use in a hot section of a gas turbine engine. The invention may be used for new or refurbished parts to restore dimensions of the component and, in particular, radial dimensions.

11 Claims, 4 Drawing Sheets

LASER SHOCK PEENING SURFACE ENHANCEMENT FOR GAS TURBINE ENGINE HIGH STRENGTH ROTOR ALLOY REPAIR

RELATED PATENT APPLICATIONS

The present Application deals with related subject matter in co-pending U.S. Pat, Ser. No. 08/319,346, entitled "LASER SHOCK PEENED ROTOR COMPONENTS FOR TURBOMACHINERY", U.S. Pat. Ser. No. 08/373,133, entitled "LASER SHOCK PEENED GAS TURBINE ENGINE FAN BLADE EDGES", U.S. Pat. Ser. No. 08/362,362, entitled "ON THE FLY LASER SHOCK PEENING", U.S. Pat. Ser. No. 08/399,285, entitled "LASER SHOCK PEENED GAS TURBINE ENGINE COMPRESSOR AIRFOIL EDGES", filed Mar. 6, 1995, and U.S. patent application Ser. No. 08/399,321, entitled "LASER SHOCK PEENING FOR GAS TURBINE ENGINE VANE REPAIR", filed Mar. 6, 1995.

BACKGROUND OF THE INVENTION

1. Field of the Invention

This invention relates to gas turbine engine turbine dimensional restoration repair using air plasma thermal metallic spray processes and, more particularly, to such turbine rotor repairs having localized compressive residual stresses imparted by laser shock peening to the substrate.

2. Description of Related Art

A gas turbine engine includes a fan section, compressor section, a combustion section and a turbine section. Disposed within the turbine section are alternating annular stages of circumferentially disposed moving blades and stationary vanes. The rows or stages of vanes and blades are concentrically located about a center-line axis of the gas turbine engine. The blades are mounted on a disk which rotates about its central axis. Hot combustion gases exit the combustor and pass through the turbine section, whereupon the blades which are mounted on the disks rotatably drive a shaft, thus, providing shaft work for driving the fan and compressor sections and auxiliary systems. Higher gas temperatures allow more work to be extracted from the gases in the turbine section, thus, increasing the overall efficiency of the gas turbine engine.

The assembly of rotating components of a gas turbine engines, including aircraft gas turbine engines, is generally referred to as the rotor and operates at high rotational speeds that subject the rotor's components to very high tensile stress fields, particularly, at radially outer edges of the rotors. Furthermore, portions of the rotor that operate in the turbine are subject to high temperature operating conditions. Cobalt and nickel-base superalloy materials have been developed to provide mechanical strength at high temperatures so that the operating temperature capability of the turbine section is increased over the operating temperatures of prior designs. Rotor components are constructed to be highly resistant to deformation at high temperature are usually produced by various types of forging process. The material and processes shapes are very costly because of the nature of the alloys and the complexity of the shapes of the components. The cost of such forgings are high and, thus, it is highly desirable to be able to repair the forging and components should any of the components be incorrectly machined or otherwise damaged during handling or operation. In spite of the development of casting operations and procedures which require close control and supervision components are still damaged during production and during operation, particularly, due to wear. Damages to forgings during production include nicks and dings due to handling and mismachining. These damages require repairs to avoid substantial amounts of waste and component replacement.

Gas turbine engine hot section components are particularly subject to damage or degradation in operation. This may be in the form of dimensional losses due to erosion, oxidation or corrosion, or distortion. When an engine is overhauled, these components are either replaced by new parts, which is very expensive, or repaired, which is clearly more desirable if a cost savings may be achieved. Several methods have been devised in which a metal is deposited by spraying onto a substrate to form an article of more complex shape, but the mechanical properties of such deposited layers of material have been in general much poorer than those of the corresponding wrought material. Similar methods are used to restore damaged or worn metal articles but, in this case, there is an additional problem in that the air plasma thermal metallic spray process causes low cycle fatigue life loss in the substrate below the deposited layer. This degrades the effectiveness of the repair.

To this end, a number of repair methods have been developed utilizing air plasma thermal metal spraying, brazing and welding for dimensional restoration. The air plasma thermal metal spraying process most frequently used involves a plasma heat source and powder consumables. However, such air plasma thermal metal spraying processes of the past have many limitations. Though such air plasma thermal metal spraying is most suitable for providing relatively thin coatings, problems and difficulties occur when it is used to repair relatively large geometric dimensions. Air plasma thermal metal spraying produces overlays that are mechanically bonded to substrates, do not have the structural integrity of the original forged component, and potentially degrade the fatigue life of the substrate. Thus, even though satisfactory for many repairs, it is highly desirable to develop better repairs that do not degrade the low cycle fatigue properties of the parent metal substrate and also may have higher mechanical bond strength to the substrate.

One repair method, disclosed in U.S. Pat. No. 4,878,953, entitled "Method of Refurbishing Cast Gas Turbine Engine Components and Refurbished Component", provides a source of background information related to methods for refurbishing cast gas turbine engine components and, particularly, for components made with nickel-base, cobalt-base and iron-base superalloys for use in the hot sections of gas turbine engines and, more particularly, for components exposed to high temperature operating conditions. U.S. Pat. No. 4,224,356, entitled "Deposition of Metals on a Base" discloses prior art methods for improving mechanical properties of a deposited metal by subjecting it to peening after deposition by bombarding the metal surface with relatively hard shot, thereby, effecting a cold working of the metal in the surface region thereof. Among the disadvantages noted by the inventor are internal compressive stresses, which are generated by the cold working action of the subsequent peening and, therefore, the patent suggests simultaneously spray depositing metal onto a substrate, whilst at the same time bombarding the deposit with hard rounded particles, so that the deposit is hot plastically deformed as it is being built up in order to provide "greatly enhanced physical and mechanical properties". This method involves complex and expensive equipment and processes.

The present invention is directed at all of the concerns and disadvantages noted above for using air plasma metal spray or deposition on a substrate of a metallic component in order to build up the component or to provide dimensional restoration. The present invention provides a dimensional restoration method and article, and gas turbine engine rotor component in particular, having a substrate with regions of deep compressive residual stresses imparted by laser shock peening over an area of the substrate upon which at least one layer of metal is deposited by air plasma or other metal spraying method.

The region of deep compressive residual stresses imparted by laser shock peening of the present invention is not to be confused with a surface layer zone of a work piece that contains locally bounded compressive residual stresses that are induced by a hardening operation using a laser beam to locally heat and, thereby, harden the work piece such as that which is disclosed in U.S. Pat. No. 5,235,838, entitled "Method and Apparatus for Truing or Straightening Out of True Work Pieces". The present invention uses multiple radiation pulses from high power pulsed lasers to produce shock waves on the surface of a work piece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser peening, as understood in the art and as used herein, means utilizing a laser beam from a laser beam source to produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". However, the prior art does not disclose a metallic layer sprayed onto a laser shock peened surface area of a metallic substrate having a region with deep compressive residual stresses imparted by laser shock peening extending into the substrate from the laser shock peened surface of the type claimed by the present patent nor the methods of how to produce them. It is to this end that the present invention is directed.

SUMMARY OF THE INVENTION

The present invention provides a metallic article having a metallic substrate, at least one metallic layer sprayed onto a laser shock peened surface area of the substrate, and a region having deep compressive residual stresses imparted by laser shock peening extending into the substrate from the laser shock peened surface. The metallic substrate and or layer may be made from an alloy such as a Cobalt or a Nickel based superalloy or Titanium.

An exemplary embodiment of the present invention is a gas turbine engine rotor component such a disk and, more particularly, a turbine disk suitable for use in a hot section of a gas turbine engine.

The invention may be used for new or refurbished parts to restore dimensions of the component and, in particular, radial dimensions. One method of the present invention is used to restore a dimension in a metallic article by laser shock peening a surface area of a metallic substrate of the metallic article using a laser beam with sufficient power to vaporize material on the surface area to form a region having deep compressive residual stresses imparted by the laser shock peening extending into the substrate from the laser shock peened surface. Then at least one metallic layer is sprayed on the laser shock peened surface area of the substrate. The surface area of a metallic substrate may first be painted with a paint material suitable to generate the plasma, which results in shock waves to form the region having deep compressive residual stresses.

ADVANTAGES

Advantages provided by the present invention include improved ability to extend the useful life of metallic articles and, in particular, gas turbine engine rotors and rotor components as compared to currently available methods. The present invention provides a more effective method of dimensional restoration for a metallic article, as well as an article with a dimensional restoration that has improved structural integrity. The present invention provides rotor and rotor component having metallic spray process repairs with improved the low cycle fatigue properties of the parent metal substrate and also higher mechanical bond strength to the substrate. The present invention provides substrate material properties such as strength and heat resistance which more closely approach those of the parent metal substrate forgings. The present invention also offers wider repairability limits and makes available repairs on hardware currently considered unrepairable because of overspray in low cycle fatigue limiting areas of the rotor and rotor components.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
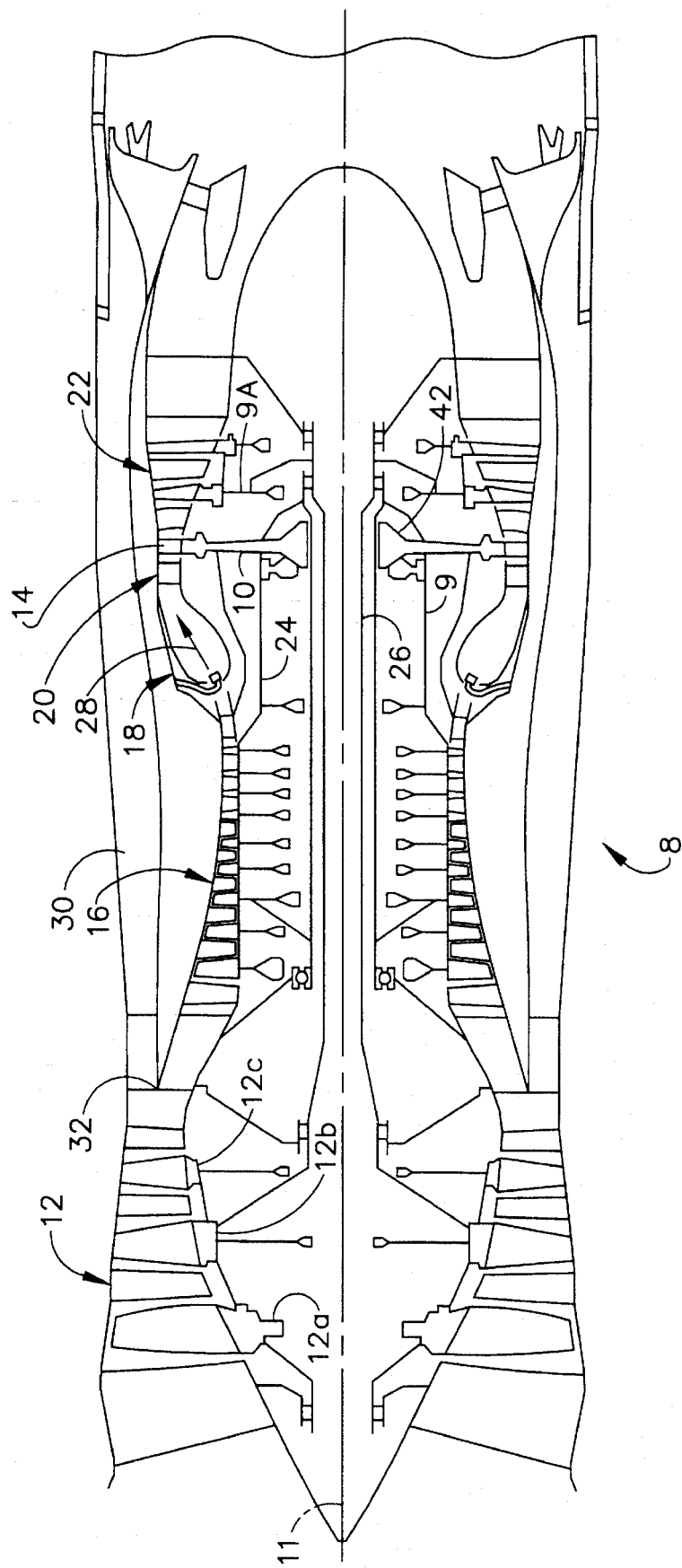
FIG. 1 is a cross-sectional illustrative view of an exemplary aircraft gas turbine engine in accordance with the present invention.

Illustrated in FIG. 1 is a schematic representation of an exemplary aircraft gas turbine engine 8 including an annular turbine disk 10 of rotor 9 in accordance with the present invention. The gas turbine engine 8 is circumferentially disposed about an engine centerline 11 and has, in serial flow relationship, a fan section 12, a high pressure compressor 16, a combustion section 18, a high pressure turbine 20, and a low pressure turbine 22. The combustion section 18, high pressure turbine 20, and low pressure turbine 22 are often referred to as the hot section of the engine 8. A high pressure rotor shaft 24 connects, in driving relationship, the high pressure turbine 20 to the high pressure compressor 16, essentially forming the high pressure rotor 9, and a low pressure rotor shaft 26 drivingly connects the low pressure turbine 22 to the fan section 12, essentially forming a low high rotor 9A. Fuel is burned in the combustion section 18 producing a very hot gas flow 28 which is directed through the high pressure and low pressure turbines 20 and 22 respectively to power the engine 8. A portion of the air passing through the fan section 12 is bypassed around the high pressure compressor 16 and the hot section through a bypass duct 30 having an entrance or splitter 32 between the fan section 12 and the high pressure compressor 16. Many engines have a low pressure compressor (not shown) mounted on the low pressure rotor shaft 26 between the splitter 32 and the high pressure compressor 16. The fan section 12 is a multi-stage fan section as are may gas turbine engines as illustrated by three fan stages 12a, 12b, and 12c. A plurality of turbine rotor blades 14 are circumferentially mounted on the periphery of the turbine disk 10.

Figure 2:
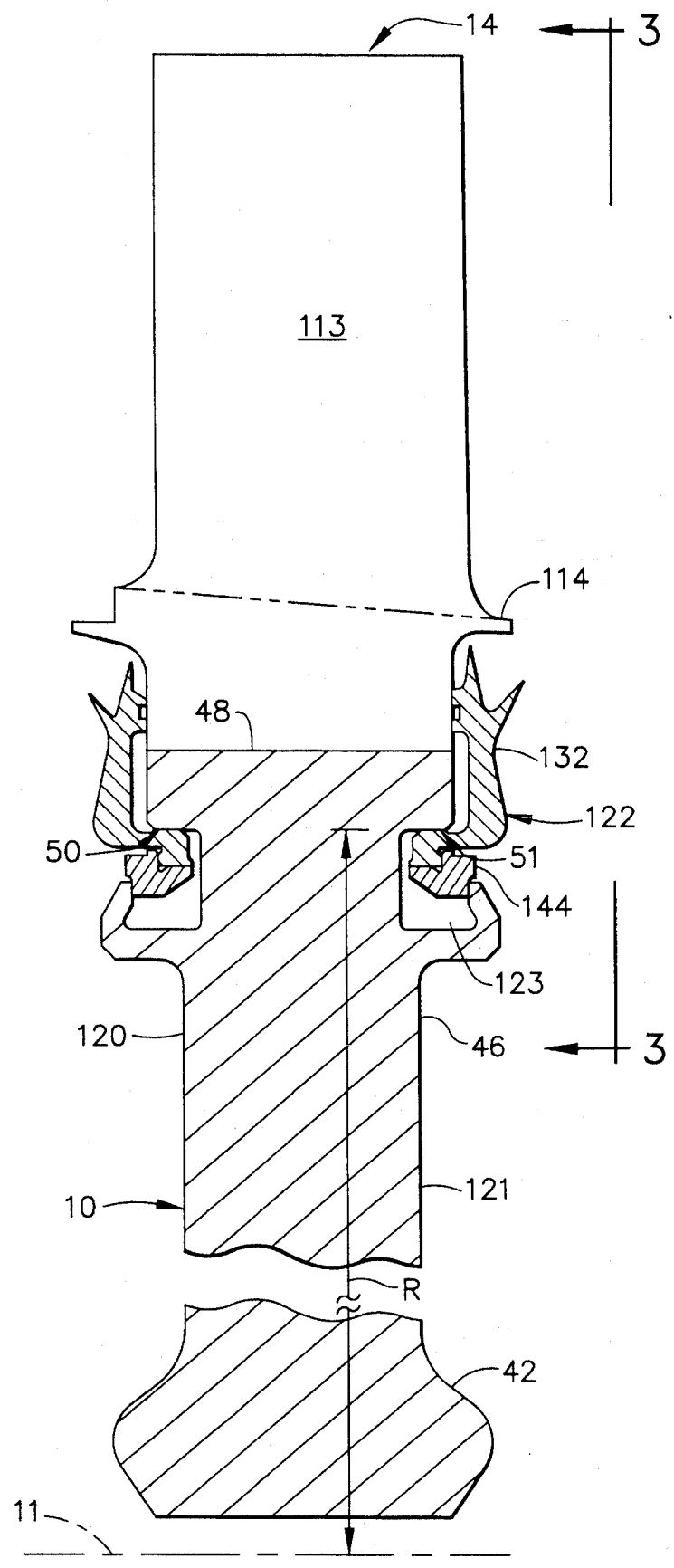
FIG. 2 is a cross-sectional illustrative side view of a turbine disk in FIG. 1.
Figure 3:
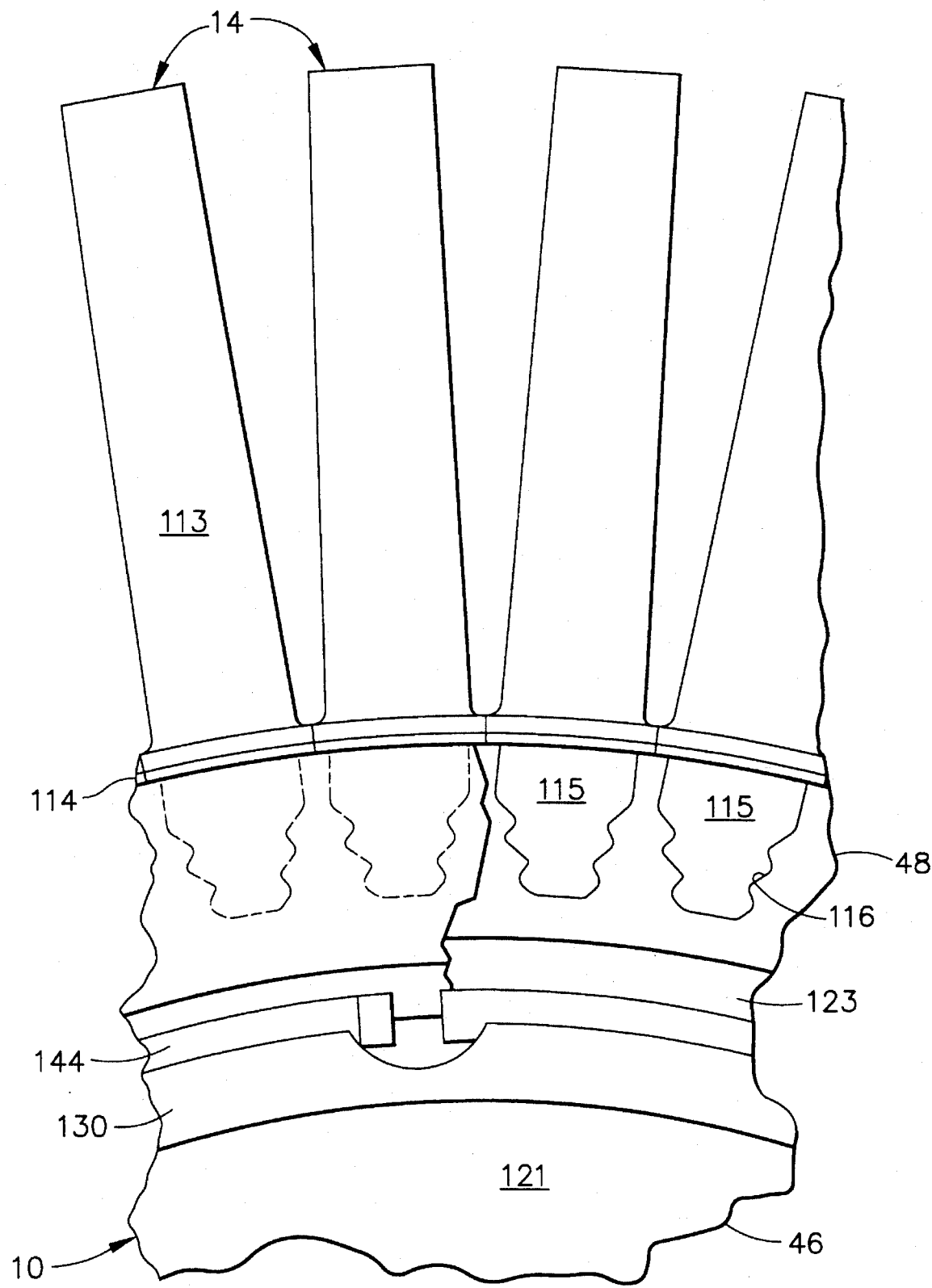
FIG. 3 is a schematic elevational front view, taken through 3—3 in FIG. 2, looking at several rotor blades and rotor disk of the gas turbine engine in FIG. 1.
Figure 4:
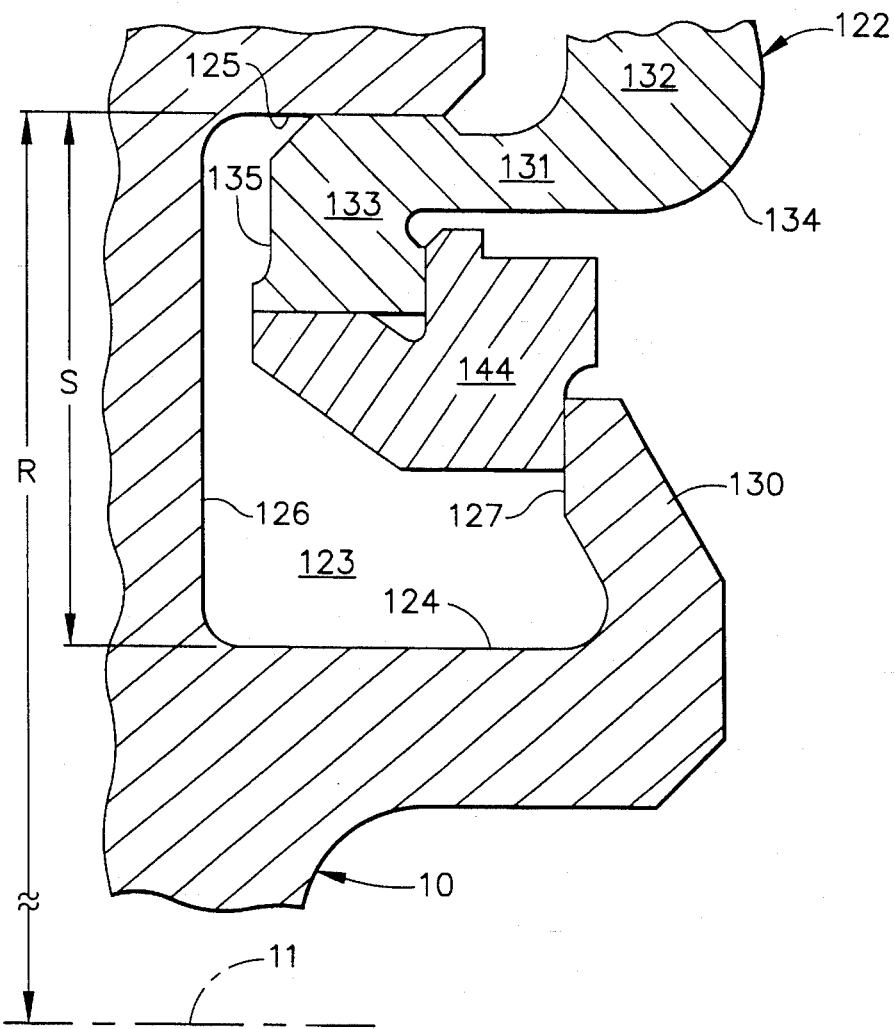
FIG. 4 is an enlarged view of the turbine disk in FIG. 2 in the vicinity of the rim of the turbine disk.

Referring further to FIGS. 2, 3 and 4 in conjunction with FIG. 1, the rotor disk 10 has a hub 42 extending axially parallel to the centerline 11 of the gas turbine engine 8, a web 46 extending radially outwardly from the hub 42 culminating in a rim 48. The rim 48 is designed to support the circumferentially extending row of turbine rotor blades 14 in dovetail slots 116 in a manner well known in the field. Blade retainers, including boltless blade retainers, were developed to retain the turbine rotor blades 14 in the axial slots. A forward rabbet 50 and an aft rabbet 51 helps secure these retainers to the disk 10 as disclosed in U.S. Pat. No. 4,304,523, entitled "Means and Method for Securing a Member to a Structure" and U.S. Pat. No. 4,890,981, entitled "Boltless Blade Retainer" both of which are hereby incorporated by reference. The disk 10 extends radially from the engine centerline 11 and, as can best be seen in FIG. 2, each rotor blade 14 includes an airfoil 113, a platform 114, and a dovetail 115. Each dovetail is sized and shaped for being received by a dovetail slot 116, a plurality of which are located around the radially outer portion of the disk 10. Each dovetail slot 116 is arranged in the disk 10 such that the opening of the slot extends through either the upstream axially facing side 120 or the downstream axially facing side 121, or through both sides 120 and 121 of the disk 10. By "axially" is meant in a direction parallel to the engine longitudinal axis or engine centerline 11. When the dovetail 115 of each rotor blade 14 is disposed in the appropriate dovetail slot 116, the rotor blade 14 is held in place against movement radially and against movement tangentially, that is, in a direction parallel to the sides 120 and 121 of the disk 10. However, the dovetail arrangement does not prevent movement of each rotor blade in the axial direction.

The structure or disk 10 includes an annular recess 123 in each axially facing side 120 or 121 against which a blade retainer is to be secured. The recess 123 is defined by a plurality of walls. The walls of the recess 123 include a radially inner wall 124, a radially outer wall 125, an axially inner wall 126, and an axially outer wall 127. The axially outer wall 127 includes a side of a radially extending flange 130 of the disk 10. By "axially inner" or "axially inward" is meant in an axial direction toward the center of the disk 10 which is perpendicular to the engine centerline 11. By "axially outer" or "axially outward" is meant in an axial direction away from the center of the disk 10.

The blade retainer 122, which is to be secured to the structure or disk 10, includes a base 131, an arm 132, and a leg 133. The arm 132 extends substantially perpendicularly, and preferably radially outward, from a first side, or axially outer side 134, of the base 131. The leg 133 extends substantially perpendicularly, and preferably radially inward, from a second side, or axially inner side 135, of the base 131. Part of the blade retainer 122, and more specifically, the base 131 and the leg 133 is disposed in the recess 123. The size of the opening of the recess 123 between the radially outer wall 125 and the flange 130, denoted by distance S, is sufficiently large such that the base 131 and the leg 133 can be inserted therethrough, and the axial dimension of the recess 123 is sufficiently large such that the leg 133 and at least a portion of the base 131 can be disposed therein. Wear on the surface of the radially outer wall 125 causes it to be out of dimension as defined by its radial dimension R with respect to the engine centerline 11. The present invention provides a dimensionally restored radially outer wall 125 and a method to do so. Disposed within the recess 123 of the disk 10, is a substantially annular retaining ring 144. Because the retaining ring 144 and the base 131 and leg 133 of the blade retainer 122 are disposed within the recess 123, rather than protruding from the disk 10 into the airstream, windage, or disturbance of the airflow across the disk 10 is reduced. The retaining element, or retaining ring 144, is sized circumferentially such that it approximates the circumferential dimensions of the recess 123 and can therefore be disposed within the recess. Thus one can see the importance of maintaining adequate margins for the radial dimension R so that the retaining ring 144 won't fret or wear or move during operation.

Figure 5:
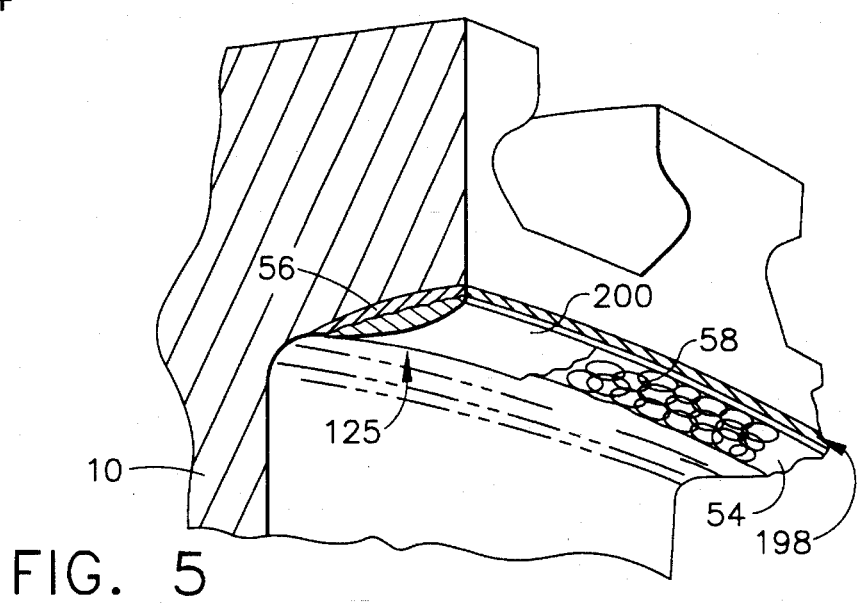
FIG. 5 is a partial perspective cut-away view of the rim of the turbine disk in FIG. 4.

Referring now to FIG. 5, the radially outer wall 125 provides a substrate 198, which may first be first suitably prepared or treated, and then laser shock peened to produce an annular laser shock peened surface 54 and a pre-stressed region 56 having deep compressive residual stresses imparted by laser shock peening (LSP) extending into the radially outer wall 125 and the substrate 198 from the laser shock peened surface. The annular laser shock peened surface 54 and the pre-stressed region 56 extend over the entire area of dimensional restoration which is at least over the entire abutting area between the radially outer wall 125 and the base 131 in FIGS. 2 and 4.

At least one metallic layer 200 is sprayed onto the laser shock peened surface 54 of the substrate 198 to restore the radially outer wall 125 to its original or design radial dimension R. The metallic substrate 198 may be made from a wrought forging of a Nickel based superalloy or Titanium based alloy. The metallic layer 200 may be made from a Nickel or Cobalt based superalloy. The disk 10 and its substrate 198 are preferably made from a wrought forging of a Nickel based superalloy or Titanium based alloy. Note that on other rotor components other types of material may be used for the sprayed on metallic layer. For example aluminum oxide may be used on seal teeth.

Though the exemplary embodiment of the present invention is illustrated for a gas turbine engine rotor component such as a disk and, more particularly a turbine disk suitable for use in a hot section of a gas turbine engine other metallic articles may be fashioned in the same manner. The invention may be used for new or refurbished parts to restore dimensions of the component and, in particular, radial dimensions.

The laser shock peened surface 54 is formed by overlapping laser shocked peened circular spots 58. The laser beam shock induced deep compressive residual stresses in the compressive pre-stressed regions 56 are generally about 50–150 KPSI (Kilo Pounds per Square Inch) extending from the laser shocked peened surfaces 54 to a depth of about 20–50 mils into laser shock induced compressive residually pre-stressed regions 56. The laser beam shock induced deep compressive residual stresses are produced by repetitively firing a high energy laser beam that is focused a few mils above or below the laser shock peened surface 54 which is generally covered with a paint to create peak power densities having an order of magnitude of a gigawatt/cm$^2$. The laser beam is fired through a curtain of flowing water that is flowed over the laser shock peened surface 54 such that the paint is ablated thereby generating a plasma which results in shock waves on the surface of the material. These shock waves are re-directed towards the painted surface by the curtain of flowing water to generate travelling shock waves (pressure waves) in the material below the painted surface. The amplitude and quantity of these shockwave determine the depth and intensity of compressive stresses. The paint is used to protect the target surface and also to generate plasma. Ablated paint material is washed out by the curtain of flowing water.

This and other methods for laser shock peening are disclosed in greater detail in U.S. Pat. Ser. No. 08/319,346, entitled "LASER SHOCK PEENED ROTOR COMPONENTS FOR TURBOMACHINERY", and in U.S. Pat. Ser. No. 08/362,362, entitled "LASER SHOCK PEENING ON THE FLY", U.S. Pat. Ser. No. 08/373,133, entitled "LASER SHOCK PEENED GAS TURBINE ENGINE FAN BLADE EDGES", and U.S. Pat. Ser. No. 08/399,285, entitled "LASER SHOCK PEENED GAS TURBINE ENGINE COMPRESSOR BLADE EDGES", filed December, 1994, all of which are incorporated herein by reference.

The present invention has been illustrated in detail in the form of a turbine disk but is applicable to other turbine rotor components such as shafts, seals, and spools. While the preferred embodiment of the present invention has been described fully in order to explain its principles, it is understood that various modifications or alterations may be made to the preferred embodiment without departing from the scope of the invention as set forth in the appended claims.

We claim:

1. A metallic article comprising:

a metallic substrate;

at least one metallic layer sprayed onto a laser shock peened surface area of said substrate, and a region having deep compressive residual stresses imparted by laser shock peening extending into said substrate from said laser shock peened surface.

2. A metallic article as claimed in claim 1 wherein said metallic substrate comprises an alloy selected from a group of alloys consisting of Cobalt and Nickel based superalloy materials.

3. A metallic article as claimed in claim 2 wherein said metallic layer comprises an alloy selected from a group of alloys consisting of Cobalt based and Nickel based superalloy and Titanium alloy materials.

4. A metallic article as claimed in claim 2 wherein the metallic article having said substrate is a forging.

5. A metallic article as claimed in claim 1 wherein the metallic article having said substrate is a forging.

6. A metallic article as claimed in claim 1 wherein the metallic article is a gas turbine engine rotor component.

7. A metallic article as claimed in claim 6 wherein said component is a disk having an axis of rotation and said surface is a radially inwardly facing surface.

8. A metallic article as claimed in claim 7 wherein said radially inwardly facing surface is on a rabbet.

9. A metallic article as claimed in claim 6 wherein said component is part of a hot section for a gas turbine engine.

10. A method to restore a dimension in a metallic article comprising the following steps:

laser shock peening a surface area of a metallic substrate of the metallic article using a laser beam with sufficient power to vaporize material on the surface area to form a region having deep compressive residual stresses imparted by the laser shock peening extending into the substrate from the laser shock peened surface, and spraying at least one metallic layer on the laser shock peened surface area of said substrate.

11. A method as claimed in claim 10 further comprising a painting step before the laser shock peening step, said painting step comprising; painting the surface area with a material suitable to generate the plasma which results in shock waves to form the region having deep compressive residual stresses.

* * * * *